US012771750B2

(12) United States Patent
Tanaka

(10) Patent No.: US 12,771,750 B2
(45) Date of Patent: Oct. 20, 2026

(54) IN-VEHICLE SYSTEM AND SIGNAL PROCESSING METHOD

(71) Applicant: Panasonic Automotive Systems Co., Ltd., Kanagawa (JP)

(72) Inventor: Kazuhito Tanaka, Shiga (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 50 days.

(21) Appl. No.: 19/082,458

(22) Filed: Mar. 18, 2025

(65) Prior Publication Data

US 2025/0310406 A1 Oct. 2, 2025

(30) Foreign Application Priority Data

Mar. 28, 2024 (JP) ................................ 2024-054149

(51) Int. Cl.
*H04L 67/125* (2022.01)
*G10L 15/22* (2006.01)
*H04L 67/131* (2022.01)

(52) U.S. Cl.
CPC ............ *H04L 67/125* (2013.01); *G10L 15/22* (2013.01); *H04L 67/131* (2022.05)

(58) Field of Classification Search
CPC ...... H04L 67/125; H04L 67/131; G10L 15/22
See application file for complete search history.

(56) References Cited

U.S. PATENT DOCUMENTS

2011/0126031 A1 5/2011 Oku
2020/0189501 A1* 6/2020 Kim ........................ G10L 15/07
2021/0368310 A1* 11/2021 Hareuveni ............... G08B 5/36
2023/0406236 A1 12/2023 Inoue et al.
2024/0036856 A1 2/2024 Tanimoto et al.
2024/0286604 A1* 8/2024 Yeom ............. B60W 30/18054

FOREIGN PATENT DOCUMENTS

JP 2022-114160 8/2022
JP 2022-114161 8/2022
JP 2022-114162 8/2022
JP 2022-114163 8/2022
JP 2022-114164 8/2022
JP 2022-114165 8/2022
JP 2022-163937 10/2022
WO 2010/116523 10/2010

* cited by examiner

*Primary Examiner* — Minh Chau Nguyen
(74) *Attorney, Agent, or Firm* — Greenblum & Bernstein, P.L.C.

(57) ABSTRACT

An in-vehicle system includes a basic system provided in a vehicle, and an additional system to be added to the vehicle. When the basic system and the additional system execute processing in cooperation, in a first mode in which transmission and reception of a video signal and an audio signal are not performed between the basic system and the additional system, transmission of a control signal for controlling the additional system is limited to unidirectional transmission from the basic system to the additional system. In this case, in a second mode in which one or more lines of video audio signals each including at least one of a video signal or an audio signal are transmitted and received between the basic system and the additional system, transmission of the one or more lines of video audio signals is limited to unidirectional transmission from the basic system to the additional system.

8 Claims, 7 Drawing Sheets

IN-VEHICLE SYSTEM AND SIGNAL PROCESSING METHOD

CROSS REFERENCE TO RELATED APPLICATION

The present application is based on and claims priority of Japanese Patent Application No. 2024-054149 filed on Mar. 28, 2024.

FIELD

The present disclosure relates to an in-vehicle system and the like.

BACKGROUND

Traditionally, systems for a vehicle provided in vehicles have been proposed (see Patent Literature (PTL) 1, for example). Such a system for a vehicle includes a device for a vehicle and an external device. The device for a vehicle and the external device are connected to each other to execute processing. The external device is added to the vehicle to be connected to the device for a vehicle.

CITATION LIST

Patent Literature

PTL 1: Japanese Unexamined Patent Application Publication No. 2022-163937

SUMMARY

However, the system for a vehicle disclosed in PTL 1 can be improved upon.

In view of this, the present disclosure provides an in-vehicle system and the like capable of improving upon the above related art.

The in-vehicle system according to one aspect of the present disclosure includes a first system provided in a vehicle; and a second system to be added to the vehicle. When the first system and the second system execute processing in cooperation, (i) in a first mode in which transmission and reception of a video signal and an audio signal are not performed between the first system and the second system, transmission of a signal is limited to unidirectional transmission from the first system to the second system, and (ii) in a second mode in which one or more lines of video audio signals each including at least one of a video signal or an audio signal are transmitted and received between the first system and the second system, transmission of the one or more lines of video audio signals is limited to unidirectional transmission from the first system to the second system.

These general or specific aspects may be implemented by a system, a method, an integrated circuit, a computer program, or a recording medium such as a computer-readable CD-ROM, or may be implemented by any combination of systems, methods, integrated circuits, computer programs, and recording media. The recording medium may be a non-transitory recording medium.

The in-vehicle system according to the present disclosure is capable of improving upon the above related art.

Further advantages and effects according to one aspect of the present disclosure will be clarified from the specification and the drawings. Although such advantages and/or effects are provided by some embodiments and the configurations described in the specification and the drawings, all the configurations are not always needed.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

Figure 1:
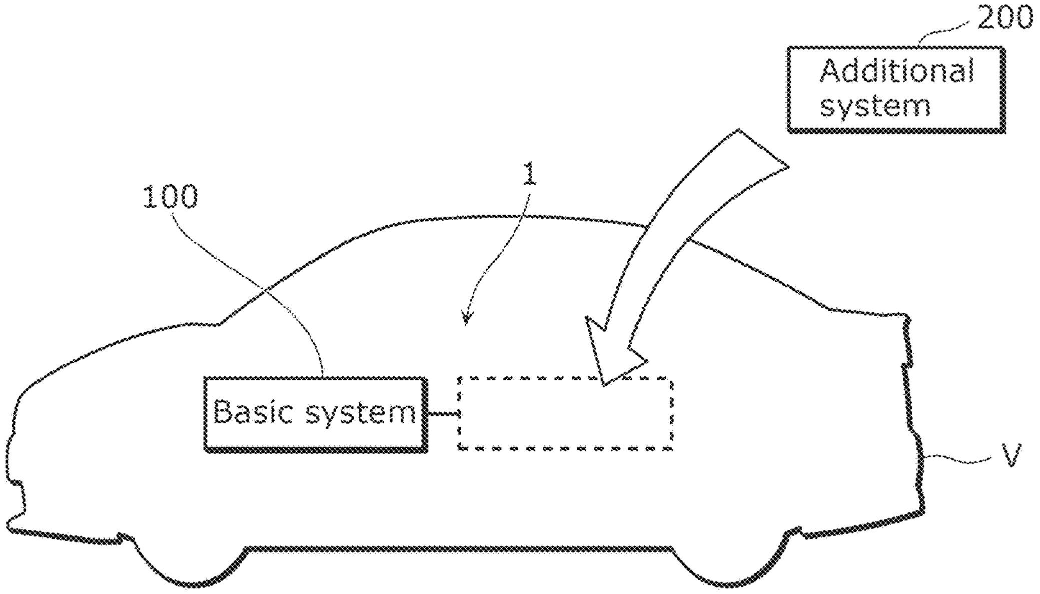
FIG. 1 is a diagram for illustrating the in-vehicle system according to an embodiment.

Underlying Knowledge Forming Basis of the Present Disclosure

The present inventor has found that the system for a vehicle disclosed in PTL 1 described in “Background” has the following problems.

In the in-vehicle system which is a system provided in a vehicle like the system for a vehicle disclosed in PTL 1, application programs (hereinafter, also referred to as applications or APPs) are used. Such applications are progressing year by year. In particular, progression of applications using artificial intelligence (AI) or generative AI, applications having high-level dialogue assistant functions, and high-level game applications is remarkable in these days. The dialogue assistant is also referred to as voice assistant, and audio analysis processing or audio recognition processing is performed on a speech sound uttered by a user. For this reason, it is expected that as the applications progress, it is also essential to update the operating systems (OSs) that operate the applications. Such progression and update of the applications and the OSs largely depend on the performance of the system on a chip (SoC) and the graphics processing unit (GPU) included in the in-vehicle system.

For example, an in-vehicle infotainment (IVI) system including a SoC is an in-vehicle system provided when the vehicle is a new car, and it is ensured that the IVI system has a predetermined margin of performance. It is assumed that the user freely installs game applications on the IVI system and uses those. However, the level of the processing performance required by the game applications has been increasing, which may cause difficulties in satisfying the processing performance requirement with the above margin in some cases. In addition, the latest version of the OS for the IVI system may be needed in some cases.

Further, when the processing performance required by the game application exceeds the performance of the SoC of the IVI system, bad influences such as delay of response may occur. In addition, the game applications may not smoothly operate.

Alternatively, the IVI system includes hardware optimized for the AI algorithm when the IVI system is provided in the vehicle. The AI is used in the dialogue assistant functions, for example. On the other hand, the AI progresses after such an IVI system is provided in the vehicle. Thus, the IVI system cannot execute AI processing using a new algorithm, or even if the IVI system can execute the AI processing, the processing rate may be remarkably reduced. For this reason, the existing hardware cannot support the progression speed of the AI.

For this reason, it is difficult to smoothly operate the latest game applications and the latest AI algorithms during 10 years or longer period of the vehicle lifetime only by the IVI system provided in a new car. In addition, it is highly expensive to replace the hardware of the IVI system by that having higher performance. In other words, the replacement substantially means rebuilding of the IVI system with unrealistic costs and the unrealistic number of steps.

Hence, in the system for a vehicle disclosed in PTL 1 proposed as an in-vehicle system, an external device is added to the existing device for a vehicle. The existing device for a vehicle corresponds to the above-described IVI system. The device for a vehicle and the external device are connected by a high-speed service bus that needs complicated control. Thereby, progression and update of the applications and the OSs can be supported, improving the performance.

However, between the device for a vehicle and the external device, one of these refers to the other's resource in a tightly coupled state. For this reason, when the external device is added, a large change in basic software (also referred to as software program) or hardware is needed in the device for a vehicle. As a result, the resource of the hardware may be consumed to reduce the processing rate in some cases.

Modification of the hardware and software (e.g., software including an OS) of the device once developed, such as the device for a vehicle, should enormously increase validation and the number of steps. This is because peace of mind of the customer who buys the vehicle is ensured, and the original equipment manufacturer (OEM) of the vehicle need to guarantee the quality and security of the system or the device.

Accordingly, in order to add the external device, the system for a vehicle disclosed in PTL 1 needs a large change in the device for a vehicle as an existing system provided in the vehicle, which may cause large loads on building the system for a vehicle.

To solve such problems, the in-vehicle system according to a first aspect of the present disclosure includes a first system provided in a vehicle; and a second system to be added to the vehicle. When the first system and the second system execute processing in cooperation, (i) in a first mode in which transmission and reception of a video signal and an audio signal are not performed between the first system and the second system, transmission of a signal is limited to unidirectional transmission from the first system to the second system, and (ii) in a second mode in which one or more lines of video audio signals each including at least one of a video signal or an audio signal are transmitted and received between the first system and the second system, transmission of the one or more lines of video audio signals is limited to unidirectional transmission from the first system to the second system. The first system is also referred to as basic system, and corresponds to an IVI system, for example. The second system is also referred to as additional system.

Thereby, transmission of the signal is limited to unidirectional transmission from the first system to the second system in the first mode, and thus no signal is transmitted from the second system to the first system. Accordingly, because no bidirectional communication between the first system and the second system is performed, the first system and the second system can be communicably connected while being loosely coupled. Even in the second mode in which one or more lines of video audio signals are transmitted and received, transmission of the one or more lines of video audio signals is limited to unidirectional transmission from the first system to the second system. For this reason, the video audio signal is not transmitted from the second system to the first system. In other words, the video signal, the audio signal, or the video signal and the audio signal are not transmitted from the second system to the first system. Accordingly, because no bidirectional communication of the video audio signal between the first system and the second system is performed, the first system and the second system can be communicably connected while being loosely coupled. Thus, in the first aspect, when the second system is added to the vehicle to perform processing in cooperation with the first system, the first system and the second system can be communicably connected while being loosely coupled. As a result, the change in hardware and software in the first system already provided in the vehicle can be effectively reduced, reducing loads on building the in-vehicle system. The one or more lines of video audio signals may be one or more video audio signals. Thus, the present disclosure can provide an in-vehicle system that can reduce loads on building the system.

In the in-vehicle system according to a second aspect, the second system may include a first processor (that is, first electronic device) and a second processor (that is, second electronic device). The first system may transmit a switching signal corresponding to the first mode to the second system in the first mode, and may transmit a a switching signal corresponding to the second mode to the second system in the second mode. When the second processor in the second system receives the switching signal corresponding to the first mode, the second processor may obtain a video audio signal including at least one of a video signal or an audio signal from the first processor, and may output the video audio signal to an output device including at least one of a display or a loudspeaker provided in the vehicle. When the second processor in the second system receives the switching signal corresponding to the second mode, the second processor may receive the video audio signal from the first system as one of the one or more lines of video audio signals, and may output the video audio signal received to the output device. The second aspect may be subordinate to the first aspect.

Thereby, both in the first mode and in the second mode, the transmission of the switching signal is limited to unidirectional transmission from the first system to the second system. Using the switching signal, the second processor in the second system switches the input of the video audio signal. In other words, the second processor switches the input between the video audio signal of the first system and the video audio signal of the first processor in the second system, and outputs the video audio signal as the switched input to the output device. When the input is switched to the video audio signal of the first system, the video audio signal is unidirectionally transmitted as one of the above-mentioned one or more lines of video audio signals. For this reason, even in the first mode in which the video audio signal is output from the second system to the output device and even in the second mode, the first system and the second system can be communicably connected while being loosely coupled. For this reason, loads on building the in-vehicle system can be further reduced.

In the in-vehicle system according to a third aspect, in the first mode, the first system may accept an operation signal in response to an input operation by a user, and may transmit the operation signal to the second system, and the first processor in the second system may receive the operation signal from the first system, may generate the video audio signal by executing processing in response to the operation signal, and may output the video audio signal generated to the second processor. The third aspect may be subordinate to the first or second aspect. The first mode is a mode in which processing of the game application is performed in the second system, for example.

Thereby, in the first mode, not only transmission of the switching signal but also transmission of the operation signal are limited to unidirectional transmission from the first system to the second system. The switching signal and the operation signal are signals having a narrow bandwidth, and are control signals for controlling the second system. Since such control signals are easy to wirelessly transmit, when the second system is added to the vehicle to perform processing in cooperation with the first system, the in-vehicle system can be built by a simple task such as introduction of software for transmitting the control signals to the first system. As a result, loads on building the in-vehicle system can be still further reduced.

In the in-vehicle system according to a fourth aspect, in the second mode, the first system may accept an audio signal of a user speech sound, and may transmit the audio signal to the second system as one of the one or more lines of video audio signals, and when the first system receives a processed result signal transmitted from the second system, the first system may generate a video audio signal according to the processed result signal, and may transmit the video audio signal generated to the second system as one of the one or more lines of video audio signals, and the first processor in the second system may receive the audio signal from the first system, execute audio recognition processing on the audio signal, and transmit the processed result signal obtained by the audio recognition processing to the first system. The fourth aspect may be subordinate to any one of the first to third aspects.

Thereby, the first processor in the second system executes the audio recognition processing on the audio signal of the user speech sound. This audio recognition processing implements the functions of the voice assistant or the dialogue assistant, for example, and is executed by AI or the like. Accordingly, accompanied by progression of AI, a second system capable of executing the audio recognition processing by the latest AI can be added, upgrading the in-vehicle system. In the addition of the second system, transmission of one or more lines of video audio signals each including the audio signal of the user speech sound is limited to unidirectional transmission from the first system to the second system. Accordingly, the first system and the second system can be communicably connected while being loosely coupled, and thus loads on building the in-vehicle system can be more appropriately reduced.

In the in-vehicle system according to a fifth aspect, the second system may execute processing in cooperation with the first system by holding and executing a software program identical to a software program included in the first system. The fifth aspect may be subordinate to any one of the first to fourth aspects.

Thereby, the first system enables the second system to execute the software program when the processing rate of the software program operating on the first system is slow or limited. In other words, even if the first system already provided in the vehicle does not have performance required by the software program, the software program can be appropriately executed by adding a second system having such performance to the vehicle. As a result, the in-vehicle system can be appropriately upgraded.

In the in-vehicle system according to a sixth aspect, the first system and the second system may wirelessly transmit and receive signals other than a video signal. The sixth aspect may be subordinate to any one of the first to fifth aspects.

Thereby, the signals having a relatively narrow bandwidth are wirelessly transmitted and received. This can remove working loads of connecting physical cables for transmitting and receiving the signals, when the second system is added. As a result, loads on building the in-vehicle system can be reduced.

The in-vehicle system according to a seventh aspect is an in-vehicle system to be added to a vehicle provided with a basic system, the in-vehicle system including a memory, and a processor that executes processing in cooperation with the basic system using the memory. (i) In a first mode in which a video signal and an audio signal are not transmitted between the basic system and the in-vehicle system, the processor does not transmit any signal to the basic system, and receives a signal transmitted from the basic system to the in-vehicle system, and executes the processing, and (ii) in a second mode in which one or more lines of video audio signals each including at least one of a video signal or an audio signal are transmitted and received between the basic system and the in-vehicle system, the processor does not transmit the one or more lines of video audio signals to the basic system, and receives the one or more lines of video audio signals transmitted from the basic system to the in-vehicle system, and executes the processing. The in-vehicle system according to the seventh aspect corresponds to the additional system in the in-vehicle system according to the first aspect.

Thereby, the same effects as those of the in-vehicle system according to the first aspect can be obtained.

Hereinafter, an embodiment will be specifically described with reference to the drawings.

The embodiments described below all illustrate general or specific examples. Numeric values, shapes, materials, components, arrangement positions of components and connection forms, steps, order of steps and the like shown in the embodiment below are exemplary, and should not be construed as limitations to the present disclosure. Among the components according to the embodiment below, the components not described in an independent claim representing the most superordinate concept of the present disclosure are described as optional components. The drawings are schematic views, and are not necessarily precise illustrations. In the drawings, identical reference signs are given to identical constitutional components.

Embodiment

FIG. 1 is a diagram for illustrating an in-vehicle system according to the present embodiment.

In-vehicle system 1 according to the present embodiment includes basic system 100 and additional system 200. Basic system 100 is also referred to as first system, and additional system 200 is also referred to as second system.

Basic system 100 is a system provided in vehicle V, and is an in-vehicle infotainment (IVI) system, for example. Such basic system 100 is provided in vehicle V when shipped (that is, when it is a new car), for example.

Additional system 200 is a system to be added to vehicle V. After vehicle V is shipped, for example, such additional system 200 is added to vehicle V to enable transmitting and receiving of signals to and from basic system 100. In other words, it can also be said that additional system 200 is an in-vehicle system to be added to vehicle V provided with basic system 100.

Specifically, when vehicle V is a new car, a user customization function or a function of the AI is implemented on the OS on a hypervisor only in basic system 100. To be noted, applications such as game applications can be installed and executed on basic system 100 by the customization function. Subsequently, for processing which needs high performance, additional system 200 is added to vehicle V, and is connected to basic system 100. Thereby, an improvement in performance such as the customization function can be implemented without changing the user interface before and after addition of additional system 200. To be noted, additional system 200 is configured as a system that implements the game application or the function of the AI in its own (specifically, a system in which game applications and the like operate on the OS). In in-vehicle system 1 according to the present embodiment, the addition of additional system 200 does not cause large processing loads on basic system 100.

Figure 2:
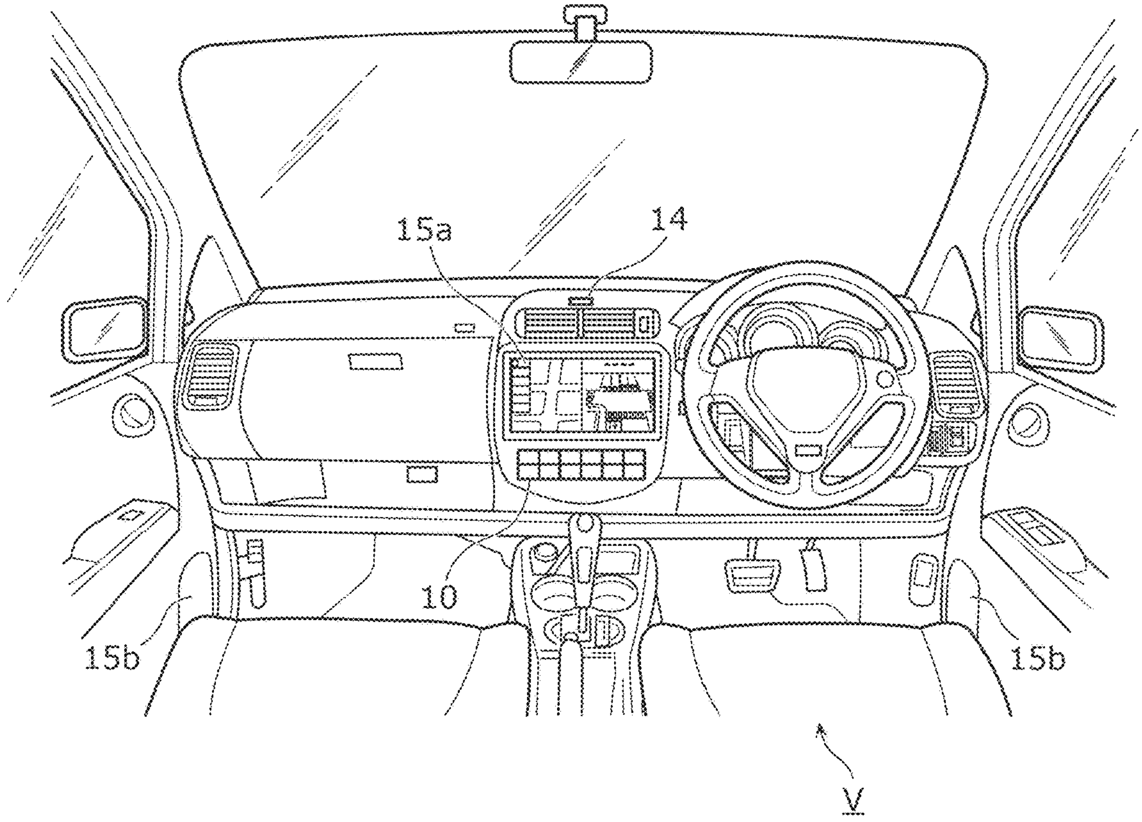
FIG. 2 is a diagram illustrating one example of the inside of the cabin of a vehicle provided with the in-vehicle system according to the embodiment.

FIG. 2 is a diagram illustrating one example of the inside of the cabin of vehicle V provided with in-vehicle system 1 according to the present embodiment.

Basic system 100 has functions as a car navigator (that is, car navigation system), music reproduction functions, video reproduction functions, game functions, and voice assistant functions, for example. Additional system 200 may have the same functions as those of basic system 100, or may execute processing based on the functions instead of basic system 100. In-vehicle system 1 including such basic system 100 and additional system 200 accepts input signals from input device 10 and microphone 14 included in vehicle V, executes processing on the input signal, and outputs the processed result to at least one of display 15*a* or loudspeaker 15*b*.

Figure 3:
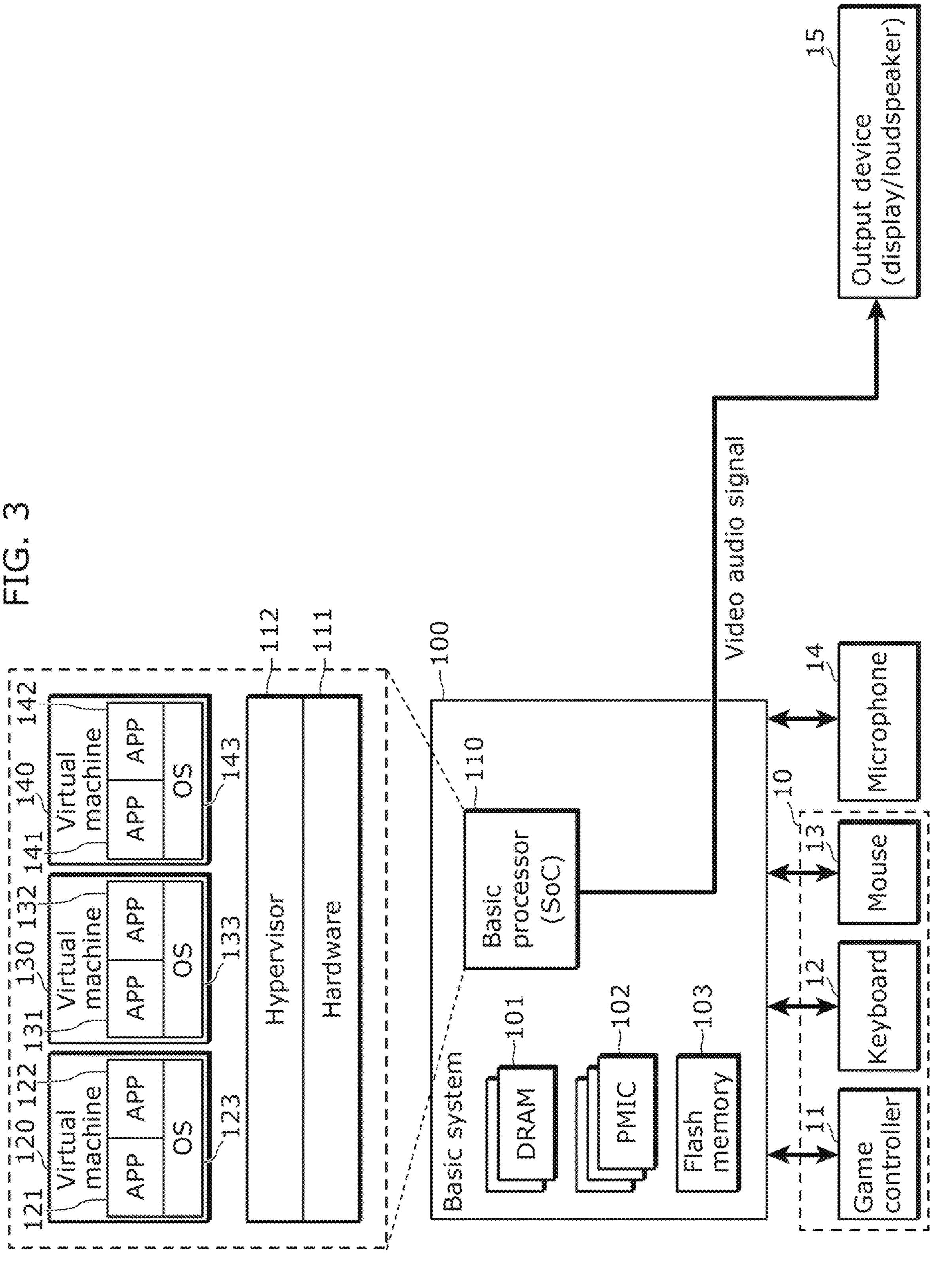
FIG. 3 is a diagram illustrating one example of the configuration of a basic system according to the embodiment.

FIG. 3 is a diagram illustrating one example of the configuration of basic system 100 according to the present embodiment.

Basic system 100 includes basic processor 110, dynamic random access memory (DRAM) 101, power management IC (PMIC) 102, and flash memory 103. PMIC 102 is an integrated circuit (IC) that controls or manages electricity fed to basic processor 110.

Basic processor 110 is configured as a SoC, for example. Basic processor 110 includes hardware 111, hypervisor 112 that operates on hardware 111, and three virtual machines 120, 130 and 140 that operate on hypervisor 112. Virtual machine 120 includes OS 123, and two application programs (APPs) 121 and 122 that operate on OS 123. Likewise, virtual machine 130 includes OS 133, and two APPs 131 and 132 that operate on OS 133, and virtual machine 140 includes OS 143, and two APPs 141 and 142 that operate on OS 143.

Such basic processor 110 accepts an input signal from at least one of input device 10 or microphone 14 described above, and executes the processing in response to the input signal using DRAM 101 and flash memory 103. Input device 10 may have at least one function among those of game controller 11, keyboard 12, and mouse 13. Alternatively, basic processor 110 may accept the input signal through wired or wireless communication with at least one of game controller 11, keyboard 12, or mouse 13 brought into the cabin of vehicle V.

Game controller 11, keyboard 12, and mouse 13, or input device 10 having these functions outputs an operation signal in response to the input operation by a user to basic processor 110 as an input signal. Microphone 14 collects the speech sound of the user, and outputs an audio signal indicating the collected speech sound to basic processor 110 as an input signal. Basic processor 110 accepts the input signal that is output in this way. Basic processor 110 may accept an input signal (that is, operation signal and audio signal) from a mobile terminal of the user, such as a smartphone, a tablet, a personal computer, or a gaming console.

Then, basic processor 110 outputs a video audio signal to output device 15, the video audio signal indicating the processed result to the input signal. The video audio signal includes at least one of the video signal or the audio signal. Output device 15 includes display 15*a* and loudspeaker 15*b* in FIG. 2, for example, displays the video according to the video audio signal on display 15*a*, and outputs the speech sound according to the video audio signal from loudspeaker 15*b*.

Figure 4:
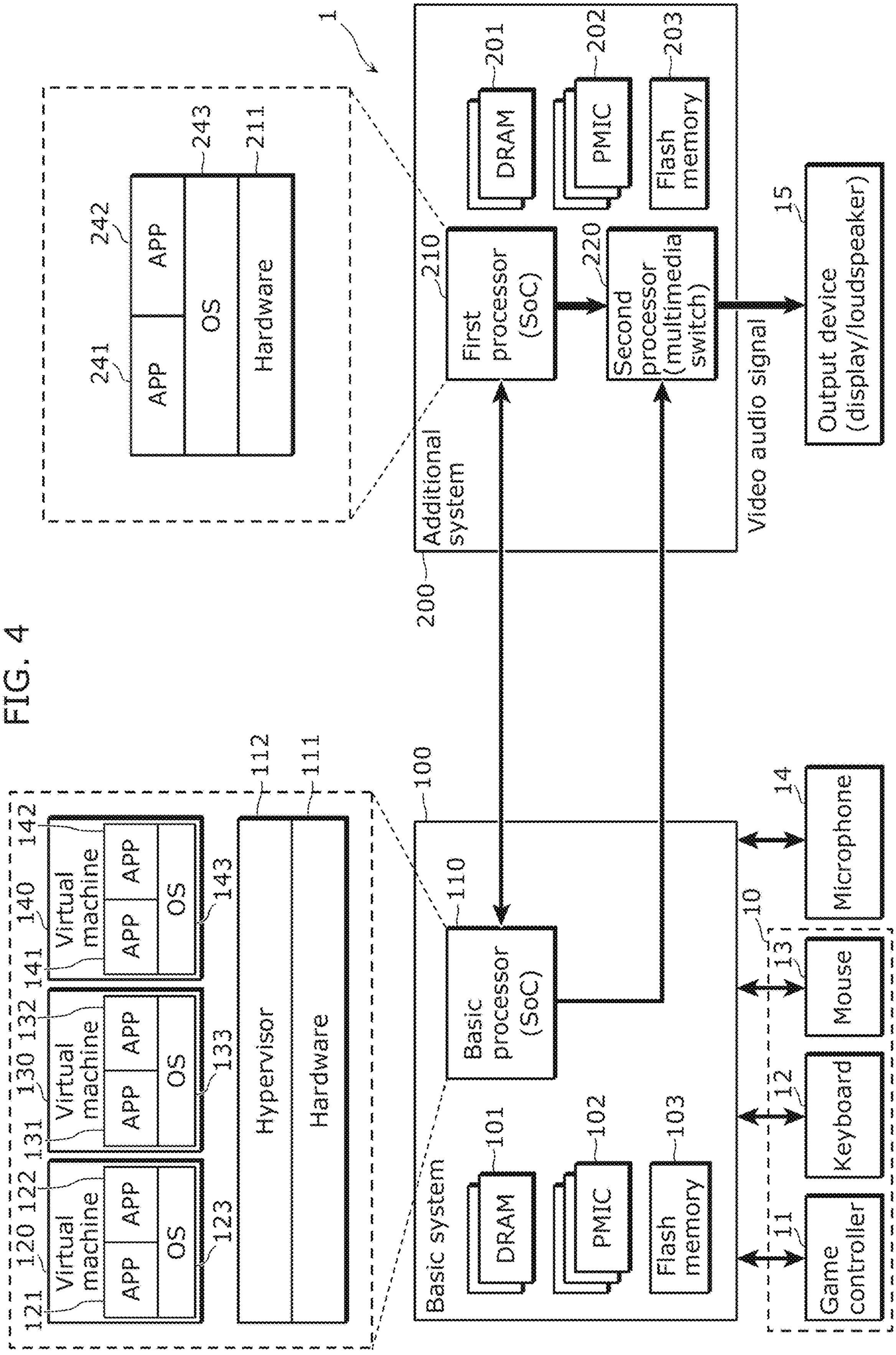
FIG. 4 is a diagram illustrating one example of the configuration of the in-vehicle system according to the embodiment.

FIG. 4 is a diagram illustrating one example of the configuration of in-vehicle system 1 according to the present embodiment.

In-vehicle system 1 is configured from basic system 100 and additional system 200 communicably connected thereto. Basic system 100 executes processing in cooperation with additional system 200.

Additional system 200 includes first processor 210, second processor 220, DRAM 201, PMIC 202, and flash memory 203. PMIC 202 is an IC that controls or manages electricity fed to first processor 210.

First processor 210 is configured as a SoC, for example. First processor 210 includes hardware 211, OS 243 that operates on hardware 211, and two APPs 241 and 242 that operate on OS 243. As a result of operation by at least one of APP 241 or 242, first processor 210 generates a video audio signal including at least one of the video signal or the audio signal, and outputs the video audio signal to second processor 220. First processor 210 communicates with basic processor 110 in basic system 100.

Second processor 220 is configured as a multimedia switch. Such second processor 220 obtains the video audio signal from basic processor 110 in basic system 100 or first processor 210, and outputs the video audio signal to output device 15. Specifically, in a first mode, second processor 220 obtains the video audio signal from first processor 210, and outputs the video audio signal to output device 15, and in a second mode, second processor 220 receives the video audio signal from basic processor 110 in basic system 100, and outputs the video audio signal to output device 15. In other words, in second processor 220, the signal to be input is switched between the video audio signal of first processor 210 and the video audio signal of basic processor 110. Such switching of the mode is performed by basic processor 110. For example, the first mode is a mode in which the game application is executed, and the second mode is a mode in which the voice assistant function is executed.

As described above, in the present embodiment, additional system 200 is added. In this addition of additional system 200, a physical cable for transmitting the video audio signal is reconnected. Specifically, a cable that connects basic processor 110 in basic system 100 to output device 15 is disconnected. Then, a cable that connects basic processor 110 in basic system 100 to second processor 220 in additional system 200 is connected, and second processor 220 is connected to output device 15 through a cable. The video audio signal is transmitted through these cables from basic system 100 to additional system 200, and is output to output device 15. The video audio signal is also referred to as broadband signal because of its relatively wide bandwidth. In the present embodiment, such a video audio signal is unidirectionally transmitted from basic system 100 to additional system 200 through the cable.

Basic processor 110 in basic system 100 controls additional system 200 using software (hereinafter, also referred to as control software), for example. The signal needed for the control is a signal having a bandwidth narrower than that of the broadband signal described above, and is also referred to as narrowband signal. The narrowband signal is unidirectionally transmitted from basic processor 110 in basic system 100 to additional system 200. Such a narrowband signal is transmitted from basic system 100 to additional system 200 wirelessly using Wi-Fi (registered trademark) or Bluetooth (registered trademark), for example. For example, the narrowband signal is an operation signal from input device 10 of the user to be accepted by basic processor 11, and is an audio signal of a user speech sound output from microphone 14 to be accepted by basic processor 110.

Thus, in the addition of additional system 200, the change in hardware to basic system 100 is only reconnection of the cables. By adding control software for unidirectional transmission of the narrowband signal to basic system 100, update from basic system 100 to in-vehicle system 1, namely, update of the system can be implemented.

Here, for example, APPs 141 and 142 included in basic processor 110 in basic system 100 and APPs 241 and 242 included in additional system 200 are the same application programs. In a specific example, APP 141 and APP 241 are the same game application, and APP 142 and APP 242 are the same application having the voice assistant functions. The latest game application when additional system 200 is added is installed as APP 141 and APP 241, and the latest application having the voice assistant functions when additional system 200 is added is installed as APP 142 and APP 242. For example, AI or generative AI may be used as the application having the voice assistant functions. OS 143 and OS 243 may be the same latest OS.

On the other hand, because additional system 200 is added after basic system 100 is provided in vehicle V, the hardware of additional system 200 has higher processing performance than that of the hardware of basic system 100. For this reason, even when APPs 241 and 242 can appropriately operate in first processor 210 in additional system 200, APPS 141 and 142 might not appropriately operate in basic processor 110 in basic system 100.

In such a case, in in-vehicle system 1 according to the present embodiment, basic system 100 causes first processor 210 in additional system 200 to execute APPs 241 and 242 rather than APPs 141 and 142.

Conversely, when APPs 141 and 142 can appropriately operate in basic processor 110 in basic system 100, basic processor 110 may operate APPs 141 and 142. In this case, first processor 210 in additional system 200 is set to a sleep mode or the like. When virtual machine 120 or 130 having a function not included in additional system 200 is executed in basic processor 110, first processor 210 in additional system 200 is also set to a sleep more or the like. This can reduce power consumption.

Additional system according to the present embodiment may be configured as a physical machine as illustrated in FIG. 4, or may be virtualized. In other words, additional system 200 may include a virtual machine that operates on a hypervisor.

Figure 5:
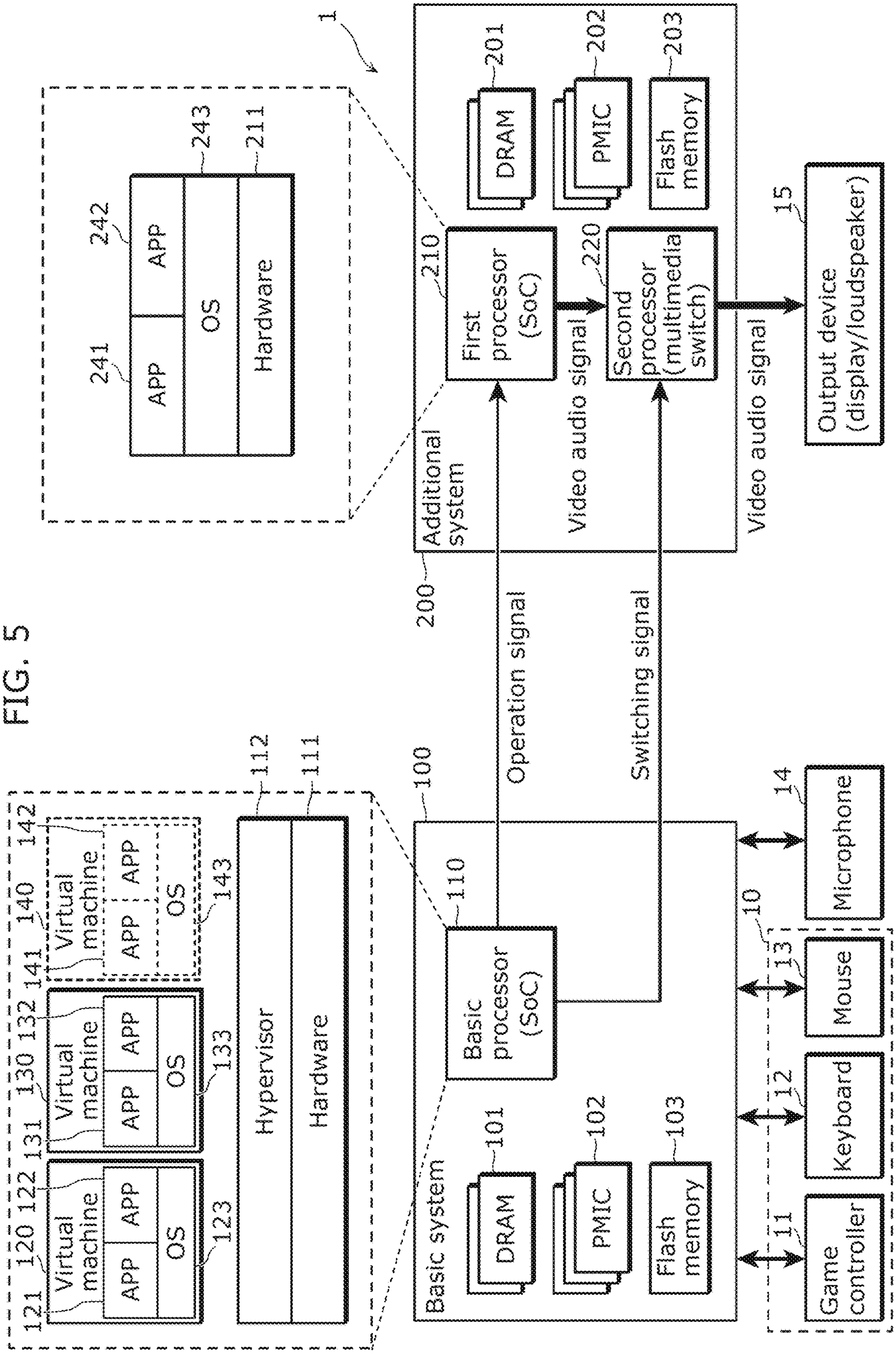
FIG. 5 is a diagram for illustrating one example of the processing operation in a first mode by the in-vehicle system according to the embodiment.

FIG. 5 is a diagram for illustrating one example of the processing operation in the first mode by in-vehicle system 1 according to the present embodiment.

The first mode is a mode in which APP 241 as a game application is executed, for example. In this first mode, basic processor 110 in basic system 100 transmits a switching signal corresponding to the first mode, namely, a switching signal indicating the first mode to second processor 220 in additional system 200. Further, basic processor 110 accepts an operation signal according to an input operation to input device 10 by the user (that is, input signal) from input device 10. Then, basic processor 110 transmits the operation signal to additional system 200. The switching signal and the operation signal are the above-mentioned narrowband signals, and are wirelessly transmitted, for example.

First processor 210 in additional system 200 receives the operation signal from basic processor 110, and generates a video audio signal by executing the processing in response to the operation signal by APP 241. Then, first processor 210 outputs the generated video audio signal to second processor 220. For example, first processor 210 generates a video audio signal including at least one of the video signal or the audio signal which indicates the processed result in the game application, and outputs the video audio signal to second processor 220.

When second processor 220 receives the above-mentioned switching signal from basic processor 110 in basic system 100, second processor 220 switches the input to the video audio signal of first processor 210. As a result, second processor 220 obtains the video audio signal from first processor 210, and outputs the video audio signal to output device 15. As a result, the video in the game application is displayed on display 15*a*, and the speech sound in the game application is output from loudspeaker 15*b*.

Figure 6:
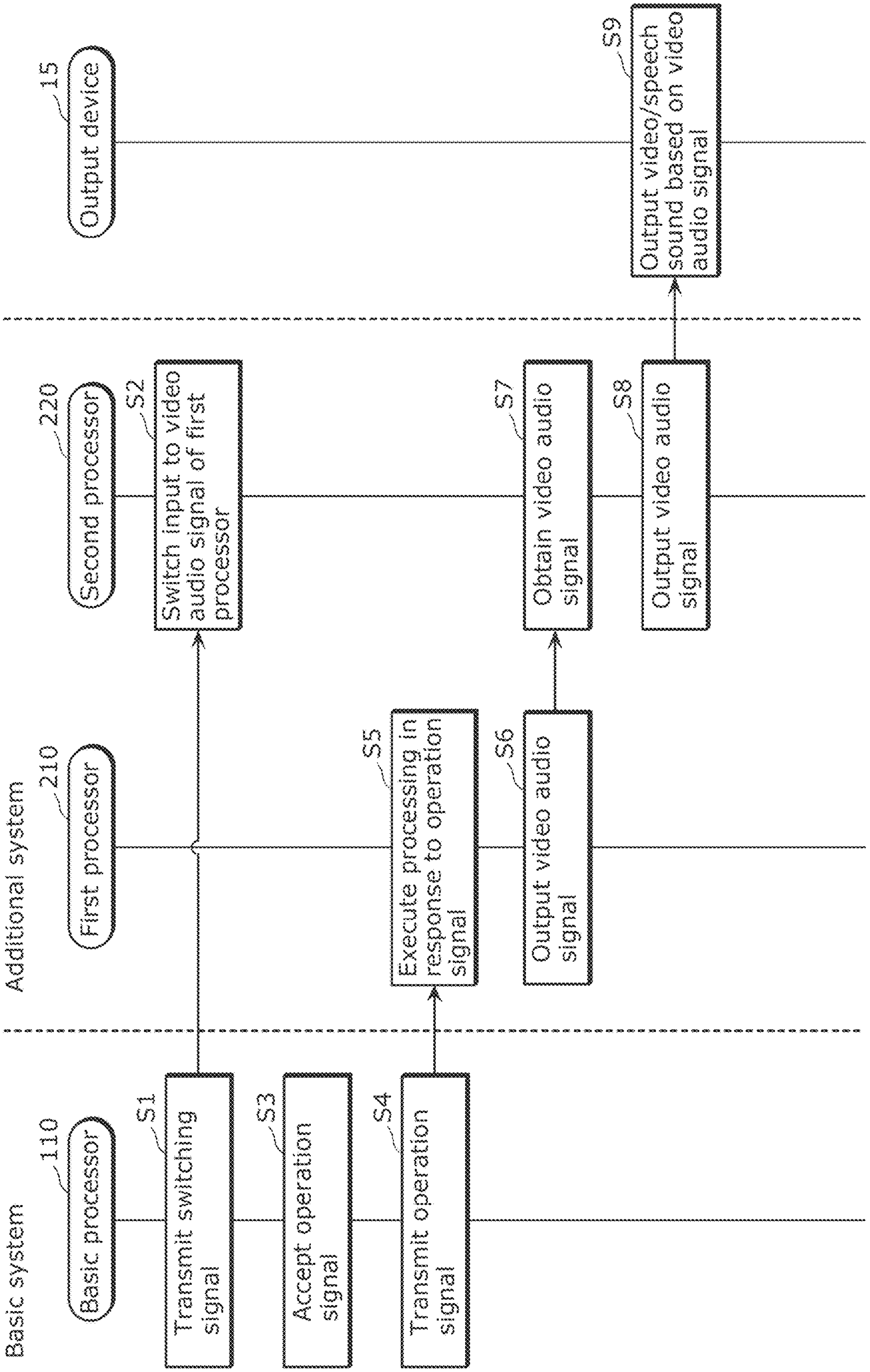
FIG. 6 is a sequence diagram illustrating one example of the processing operation in the first mode by the in-vehicle system according to the embodiment.

FIG. 6 is a sequence diagram illustrating one example of the processing operation in the first mode by in-vehicle system 1 according to the present embodiment.

Initially, basic processor 110 in basic system 100 transmits the switching signal corresponding to the first mode to second processor 220 in additional system 200 (step S1). When second processor 220 receives the switching signal, the input is switched to the video audio signal of first processor 210 (step S2). Next, when basic processor 110 in basic system 100 accepts the operation signal from input device 10 (step S3), basic processor 110 transmits the operation signal to first processor 210 in additional system 200 (step S4).

When first processor 210 in additional system 200 receives the operation signal from basic processor 110, first processor 210 executes the processing in response to the operation signal (step S5), generates the video audio signal according to the processed result, and outputs the video audio signal to second processor 220 (step S6). Second processor 220 obtains the video audio signal from first processor 210 (step S7), and outputs the video audio signal to output device 15 (step S8). Output device 15 executes at least one of the display of the video or the output of the speech sound based on the video audio signal (step S9).

Thus, in the first mode, transmission and reception of the video signal and the audio signal are not performed between basic system 100 and additional system 200. In such a first mode, transmission of the signal is limited to unidirectional transmission from basic system 100 to additional system 200. The signals unidirectionally transmitted are the operation signal and the switching signal, which are narrowband signals.

Figure 7:
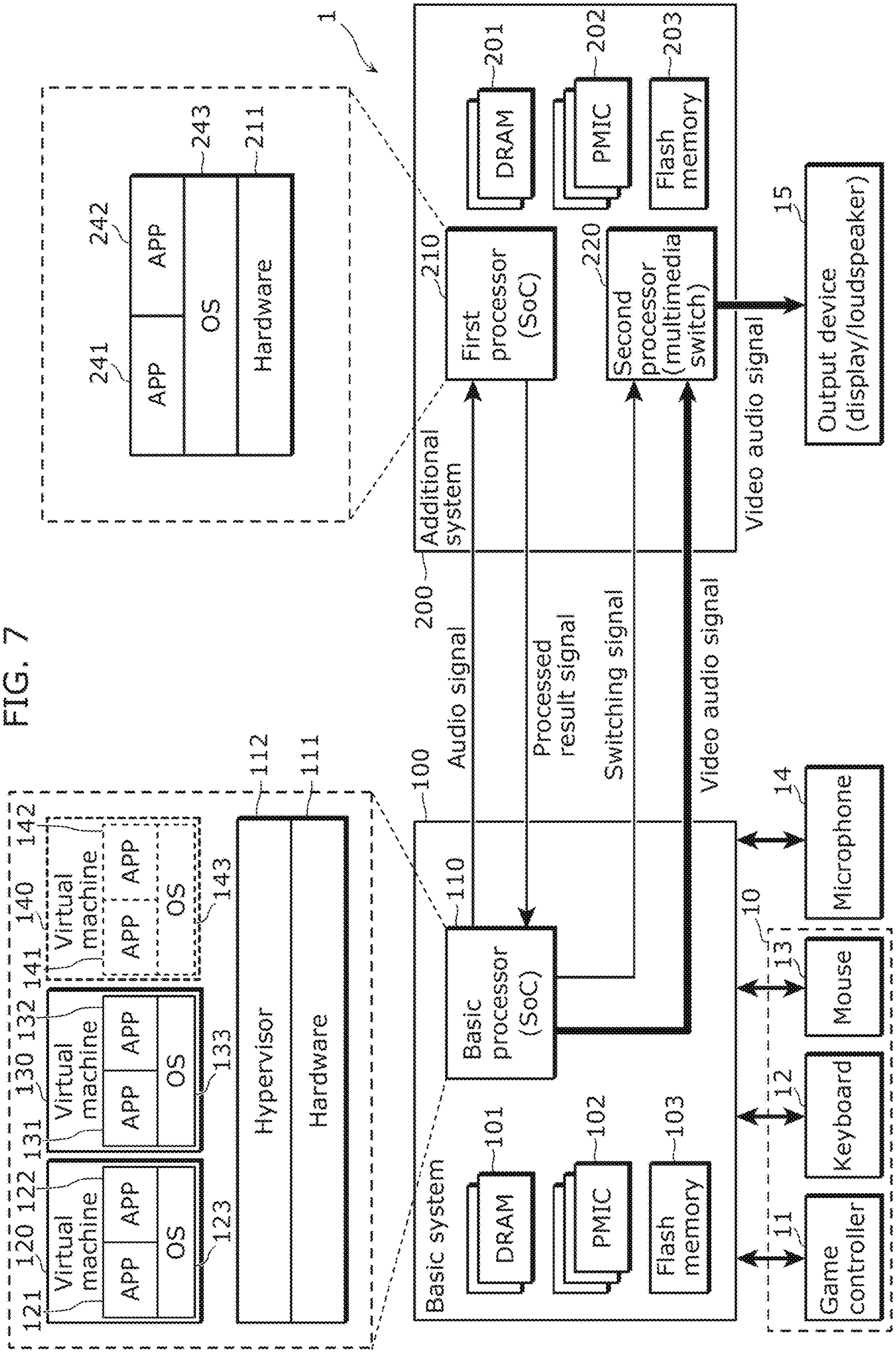
FIG. 7 is a diagram for illustrating one example of the processing operation in a second mode by the in-vehicle system according to the embodiment.

FIG. 7 is a diagram for illustrating one example of the processing operation in a second mode by in-vehicle system 1 according to the present embodiment.

The second mode is a mode in which APP 242 having the voice assistant functions is executed, for example. In this second mode, basic processor 110 in basic system 100 transmits the switching signal corresponding to the second mode, namely, the switching signal indicating the second mode to second processor 220 in additional system 200. Further, basic processor 110 accepts the audio signal of the user speech sound (that is, input signal) output from microphone 14. Then, basic processor 110 transmits the audio signal to additional system 200. The switching signal and the audio signal are the above-mentioned narrowband signals, and are wirelessly transmitted, for example.

First processor 210 in additional system 200 receives the audio signal from basic processor 110, and executes audio recognition processing on the audio signal by executing APP 242. Then, first processor 210 transmits the processed result signal obtained by the audio recognition processing to basic processor 110 in basic system 100. The processed result signal is a signal obtained after representing an instruction from the user using a speech sound or an operation content in the form of a code, for example. For example, when the user speaks to microphone 14 "Enlarge the map" or "Move the main window to upper left", the speech sound of the user is collected by microphone 14, and the audio signal indicating the speech sound is transmitted from basic processor 110 to first processor 210. The processed result signal represents the map displayed on the display of output device 15, the instruction to the main window, or the operation content, specifically "Enlarge the map" or "Move the main window to upper left" in the form of a code. It can also be said that such a processed result signal is a narrowband signal, and is an extremely small amount of signal or data. The processed result signal may also be wirelessly transmitted as the switching signal and the audio signal.

When basic processor 110 in basic system 100 receives the processed result signal from first processor 210 in additional system 200, basic processor 110 generates the video audio signal according to the processed result signal, and transmits the video audio signal to additional system 200. For example, when the processed result signal represents "Enlarge the map", a video audio signal that represents the enlarged map in the form of a video is generated. When the processed result signal represents "Move the main window to upper left", a video audio signal that represents a video including the main window moved to upper left is generated.

When second processor 220 in additional system 200 receives the above-mentioned switching signal from basic processor 110 in basic system 100, second processor 220 switches the input to the video audio signal of basic processor 110. As a result, second processor 220 receives the video audio signal from basic processor 110, and outputs the video audio signal to output device 15. As a result, a video including the enlarged map or the main window moved to upper left is displayed on display 15*a*.

Figure 8:
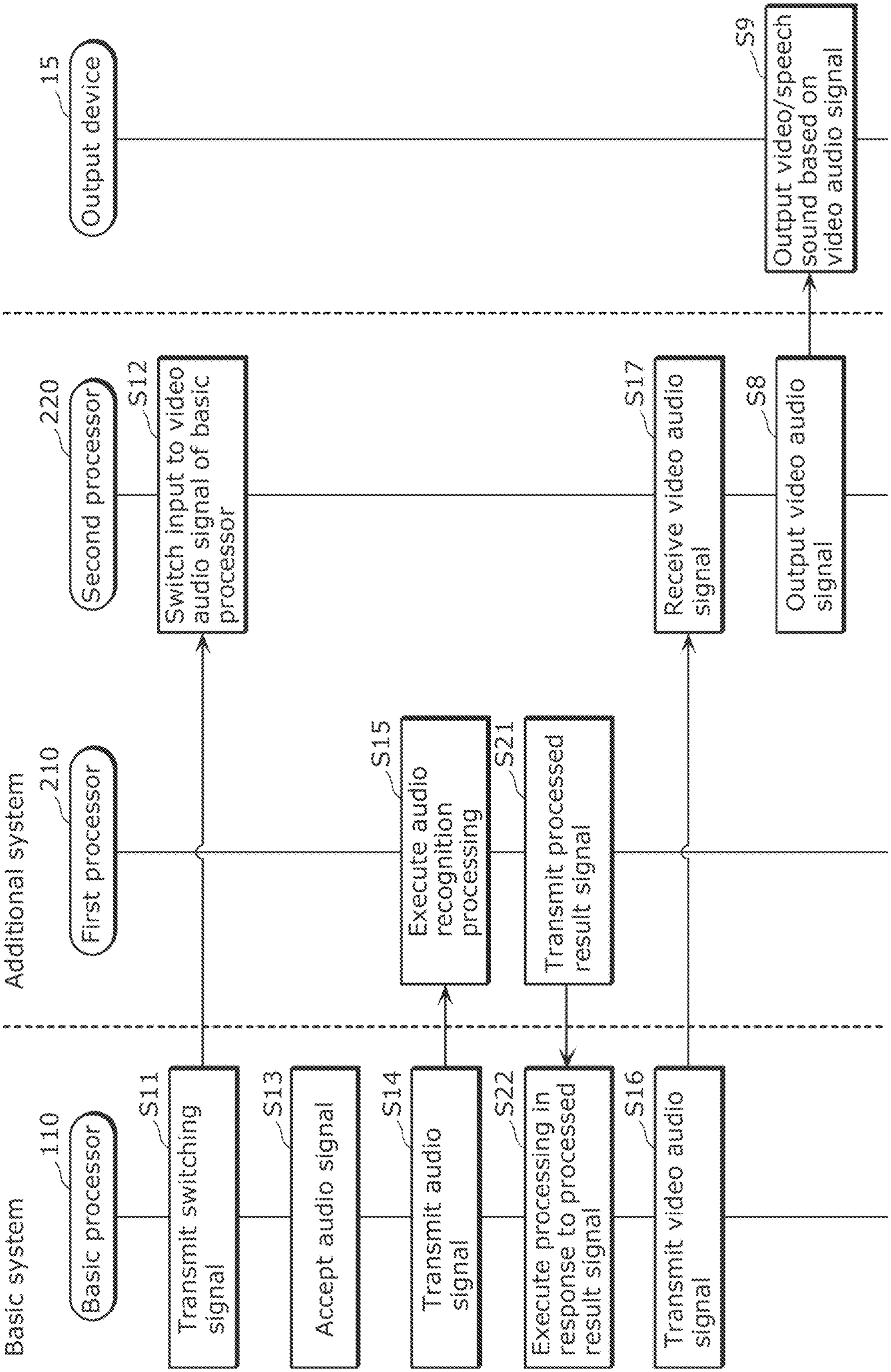
FIG. 8 is a sequence diagram illustrating one example of the processing operation in the second mode by the in-vehicle system according to the embodiment.

FIG. 8 is a sequence diagram illustrating one example of the processing operation in the second mode by in-vehicle system 1 according to the present embodiment.

Initially, basic processor 110 in basic system 100 transmits the switching signal corresponding to the second mode to second processor 220 in additional system 200 (step S11). When second processor 220 receives the switching signal, second processor 220 switches the input to the video audio signal of basic processor 110 (step S12). Next, when basic processor 110 in basic system 100 accepts the audio signal from microphone 14 (step S13), basic processor 110 transmits the audio signal to first processor 210 in additional system 200 (step S14).

When first processor 210 in additional system 200 receives the audio signal from basic processor 110, first processor 210 executes the audio recognition processing on the audio signal (step S15). Then, first processor 210 transmits the processed result signal obtained by the audio recognition processing to basic processor 110 in basic system 100 (step S21).

When basic processor 110 in basic system 100 receives the processed result signal from additional system 200, basic processor 110 generates a video audio signal by executing the processing in response to the processed result signal (step S22). Then, basic processor 110 transmits the generated video audio signal to second processor 220 in additional system 200 (step S16).

Second processor 220 in additional system 200 receives the video audio signal from basic processor 110 in basic system 100 (step S17), and outputs the video audio signal to output device 15 (step S8). Output device 15 executes at least of the display of the video or the output of the speech sound based on the video audio signal (step S9).

Thus, in the second mode, one or more lines of video audio signals each including at least one of the video signal or the audio signal are transmitted between basic system 100 and additional system 200. In addition, in such a second mode, the transmission of one or more lines of the video audio signals is limited to unidirectional transmission from basic system 100 to additional system 200. The video audio signal is a broadband signal. Accordingly, in the second mode, the transmission of the narrowband signals excluding the processed result signal and that of the broadband signals are limited unidirectionally from basic system 100 to additional system 200.

In the building of in-vehicle system 1 according to the present embodiment, control software for transmitting the narrowband signal is added to basic system 100 in order to connect additional system 200 to basic system 100. Further, in order to transmit the broadband signal from basic system 100 to additional system 200, basic system 100 is connected to second processor 220 in additional system 200 (such as a multimedia switch) through a cable. Thereby, the broadband signal is transmitted from basic system 100 to additional system 200 in a wired manner. As a result, unidirectional transmission of the narrowband signals and the broadband signals enables basic system 100 and additional system 200 to be loosely coupled. Accordingly, by simply changing or adding the control software to basic system 100, update of basic system 100 can be implemented while the problems of the conventional technique are solved.

Since no change in hardware in basic system 100 is needed for addition of additional system 200 except that the cables are reconnected, the quality and security of basic system 100 can be ensured. Further, the game applications and the applications having the voice assistant functions are applications whose values will be increased in the future, and the values can be pursued independently from control of the main body of vehicle V. Moreover, by adding a new application to additional system 200, influences over basic system 100 whose first priority is peace of mind and safety can be suppressed. For example, when the applications such as the game application and the applications having the voice assistant functions are frequently updated, accompanied by this, update of the OSs on which the applications operate is also needed. However, when the applications and the OSs are updated in additional system 200, influences over the software (that is, the OSs and the applications) in basic system 100 can be suppressed. In other words, change or addition of the software in basic system 100 is unnecessary. Even if the hardware performance of in-vehicle system 1 is obsoleted, it is sufficient that only additional system 200 is exchanged, which can reduce the working loads in upgrade of in-vehicle system 1.

As described above, in the first mode of in-vehicle system 1 according to the present embodiment, the transmission of the signal is limited to unidirectional transmission from basic system 100 to additional system 200. In the second mode of in-vehicle system 1, the transmission of one or more lines of video audio signals is limited to unidirectional transmission from basic system 100 to additional system 200.

Thereby, in the first mode, the transmission of the signal is limited to unidirectional transmission from the first system to the second system, and thus no signal is transmitted from additional system 200 to basic system 100. Accordingly, because bidirectional communication between basic system 100 and additional system 200 is not performed, basic system 100 and additional system 200 can be communicably connected while being loosely coupled. Even in the second mode in which one or more lines of video audio signals are transmitted and received, the transmission of the one or more lines of video audio signals is limited to unidirectional transmission from basic system 100 to additional system 200. For this reason, the video audio signal is not transmitted from additional system 200 to basic system 100. In other words, the video signal, the audio signal, or the video signal and the audio signal are not transmitted from additional system 200 to basic system 100. Accordingly, because bidirectional communication of the video audio signal between basic system 100 and additional system 200 is not performed, basic system 100 and additional system 200 can be communicably connected while being loosely coupled. Thus, in the present embodiment, when additional system 200 is added to vehicle V to perform processing in cooperation with basic system 100, basic system 100 and additional system 200 can be connected while being loosely coupled. As a result, changes in hardware and software in basic system 100 already provided in vehicle V can be effectively reduced, and loads on building in-vehicle system 1 can be reduced.

In the present embodiment, in the first mode, basic processor 110 in basic system 100 transmits the switching signal corresponding to the first mode to additional system 200, and in the second mode, transmits the switching signal corresponding to the second mode to the second system. When second processor 220 in additional system 200 receives the switching signal corresponding to the first mode, second processor 220 obtains the video audio signal from first processor 210, and outputs the obtained video audio signal to output device 15. When second processor 220 receives the switching signal corresponding to the second mode, second processor 220 receives the video audio signal from basic system 100, and outputs the received video audio signal to output device 15. Second processor 220 receives the video audio signal of basic system 100 as one of one or more lines of video audio signals whose transmission is limited to the above-mentioned unidirectional transmission.

Thereby, both in the first mode and in the second mode, the transmission of the switching signal is limited to unidirectional transmission from basic system 100 to additional system 200. Using the switching signal, second processor 220 in additional system 200 switches the input of the video audio signal. In other words, second processor 220 switches the input between the video audio signal of basic system 100 and the video audio signal of first processor 210 in additional system 200, and outputs the video audio signal as the switched input to output device 15. When the input is switched to the video audio signal of basic system 100, the video audio signal is unidirectionally transmitted as one of the above-mentioned one or more lines of video audio signals. For this reason, even in the first mode in which the video audio signal is output from additional system 200 to output device 15 and even in the second mode, basic system 100 and additional system 200 can be communicably connected while being loosely coupled. As a result, loads on building in-vehicle system 1 can be further reduced.

In the first mode according to the present embodiment, basic system 100 accepts the operation signal in response to the input operation by the user, and transmits the operation signal to additional system 200. First processor 210 in additional system 200 receives the operation signal from basic system 100, generates the video audio signal by executing the processing in response to the operation signal, and outputs the generated video audio signal to second processor 220.

Thereby, in the first mode, not only the transmission of the switching signal but also the transmission of the operation signal are limited to unidirectional transmission from basic system 100 to additional system 200. The switching signal and the operation signal are signals having a narrow bandwidth, and are control signals for controlling additional system 200. Since such control signals can be easily wirelessly transmitted, when additional system 200 is added to vehicle V to perform processing in cooperation with basic system 100, in-vehicle system 1 can be built by a simple task such as introduction of software to basic system 100 for transmitting the control signals. As a result, loads on building in-vehicle system 1 can be still further reduced.

In the second mode according to the present embodiment, basic system 100 accepts the audio signal of the user speech sound, and transmits the audio signal to additional system 200 as one of the above-mentioned one or more lines of video audio signals. When basic system 100 receives the processed result signal transmitted from additional system 200, basic system 100 generates the video audio signal according to the processed result signal, and transmits the generated video audio signal to additional system 200 as one of the above-mentioned one or more lines of video audio signals. First processor 210 in additional system 200 receives the above-mentioned audio signal from basic system 100, executes the audio recognition processing on the audio signal, and transmits the processed result signal obtained by the audio recognition processing to basic system 100.

Thereby, first processor 210 in additional system 200 executes the audio recognition processing on the audio signal of the user speech sound. This audio recognition processing implements the functions of the voice assistant or the dialogue assistant, for example, and is executed by AI or the like. Accordingly, accompanied by progression of AI, additional system 200 including the audio recognition processing executable by the latest AI can be added, thereby upgrading in-vehicle system 1. In the addition of additional system 200, the transmission of one or more lines of video audio signals each including the audio signal of the user speech sound is limited to unidirectional transmission from basic system 100 to additional system 200. Accordingly, basic system 100 and additional system 200 can be communicably connected while being loosely coupled, and thus loads on building in-vehicle system 1 can be more appropriately reduced.

In the present embodiment, APPs 141 and 142 in basic system 100 and APPs 241 and 242 in additional system 200 are the same. In other words, additional system 200 executes processing in cooperation with basic system 100 by holding and executing the same software program as that included in basic system 100.

Thereby, basic system 100 can cause additional system 200 to execute the software program when the processing rate of the software program operating on basic system 100 is slow. In other words, even if basic system 100 already provided in vehicle V does not have performance required by the software program, the software program can be appropriately executed by adding additional system 200 having such performance to vehicle V. As a result, in-vehicle system 1 can be appropriately upgraded.

In the present embodiment, basic system 100 and additional system 200 wirelessly transmit and receive the signals other than a video signal. For example, the signals other than the video audio signal treated by second processor 220 may be wirelessly transmitted and received.

Thereby, the signals having a relatively narrow bandwidth are wirelessly transmitted and received. This can remove working loads of connecting physical cables for transmitting and receiving the signals, when additional system 200 is added. As a result, loads on building in-vehicle system 1 can be reduced.

Since additional system 200 according to the present embodiment is added to vehicle V, it can be said that the system alone is also an in-vehicle system. Additional system 200 includes a memory such as DRAM 201, and a processor that executes processing in cooperation with basic system 100 using the memory. The processor includes first processor 210 and second processor 220, for example. In the first mode in which transmission and reception of the video signal and the audio signal are not performed between basic system 100 and additional system 200, the processor does not transmit any signal to basic system 100, and receives the signal transmitted from basic system 100 to additional system 200, and executes the processing. In the second mode in which one or more lines of video audio signals each including at least one of the video signal or the audio signal are transmitted and received between basic system 100 and additional system 200, the processor does not transmit one or more lines of video audio signals to basic system 100, and receives one or more lines of video audio signals transmitted from basic system 100 to additional system 200, and executes the processing.

Thereby, the same effects as those in in-vehicle system 1 described above can be obtained.

The above-mentioned effects of in-vehicle system 1 according to the present embodiment can also be implemented by a signal processing method performed by in-vehicle system 1. In other words, the signal processing method is a signal processing method performed by in-vehicle system 1, and in-vehicle system 1 includes basic system 100 provided in vehicle V, and additional system 200 to be added to vehicle V. In the signal processing method, when basic system 100 and additional system 200 execute the processing in cooperation, in a first mode in which transmission and reception of a video signal and an audio signal are not performed between basic system 100 and additional system 200, in-vehicle system 1 transmits a control signal for controlling additional system 200 only unidirectionally from basic system 100 to additional system 200. The signal transmitted only unidirectionally is not limited to the control signal, and any other signal may be transmitted. In a second mode in which one or more lines of video audio signals each including at least one of the video signal or the audio signal are transmitted and received between basic system 100 and additional system 200, in-vehicle system 1 transmits the one or more lines of video audio signals only unidirectionally from basic system 100 to additional system 200.

Likewise, the above-mentioned effects of additional system 200 according to the present embodiment are also implemented by a signal processing method performed by additional system 200. In other words, the signal processing method is a signal processing method performed by additional system 200 to be added to vehicle V provided with basic system 100. In the signal processing method, when additional system 200 executes the processing in cooperation with basic system 100, in a first mode in which transmission and reception of the video signal and the audio signal are not performed between basic system 100 and additional system 200, additional system 200 does not transmit any signal to basic system 100, and receives the signal transmitted from basic system 100 to additional system 200, and executes the processing. In a second mode in which one or more lines of video audio signals each including at least one of the video signal or the audio signal are transmitted and received between basic system 100 and additional system 200, additional system 200 does not transmit the one or more lines of video audio signals to basic system 100, and receives the one or more lines of video audio signals transmitted from basic system 100 to additional system 200, and executes the processing.

Thus, in-vehicle system 1 according to the present disclosure has been described based on the above embodiment, but the present disclosure is not limited to the above embodiment. The present disclosure may also cover a variety of modifications of the above embodiment conceived and made by persons skilled in the art without departing from the gist of the present disclosure.

For example, in the above embodiment, second processor 220 in additional system 200 switches the input between the video audio signal of basic processor 110 and the video audio signal of first processor 210. However, second processor 220 may synthesize the video audio signal of first processor 210 with the video audio signal of basic processor 110, and may output the synthesized video audio signal to output device 15. For example, in the first mode, basic processor 110 outputs a video audio signal indicating emergency information to additional system 200. In this case, second processor 220 synthesizes the video audio signal of first processor 210 with the video audio signal of basic processor 110. Thereby, for example, display **15*a* of output device 15 displays a screen showing the emergency information which is superimposed on the game screen. If basic system 100 has enough processing capacity, additional system 200 may transmit the video audio signal to basic system 100. In this case, basic processor 110 in basic system 100 receives the video audio signal from additional system 200, and synthesizes the video audio signal with the video audio signal of basic processor 110. Alternatively, when the video audio signal of first processor 210 is output from second processor 220 to output device 15 in the first mode, basic processor 110 may switch the video audio signal to the video audio signal of basic processor 110 without performing the above-mentioned synthesis. In other words, basic processor 110 switches the input to second processor 220 by transmitting the switching signal to second processor 220. Thereby, for example, the game screen displayed on display 15***a* is switched to the screen of the emergency information.

When additional system 200 is added, existing display 15*a* included in output device 15 may be replaced by a display having a resolution suitable for the performance of additional system 200. The narrowband signal may be transmitted in a wired manner using a universal serial bus (USB) or a Peripheral Component Interconnect (PCI)-Express.

In the above embodiment, basic system 100 is configured as an IVI system. However, basic system 100 is not limited to such an IVI system, and may be configured as another system.

In the above embodiment, each of the components may be configured with a dedicated circuit or hardware, or may be implemented by executing a software program suitable for the component. The components may be implemented by a program executor, such as a central processing unit (CPU) or a processor, reading out and executing software programs recorded on a hard disk or a recording medium such as a semiconductor memory. Here, a program which is software for implementing the device or system according to the above embodiment causes a computer to execute the steps included in the sequence diagram in FIG. 6 or 7.

The present disclosure also covers the following cases.

(1) The above-mentioned device or system may be specifically a computer system configured with a microprocessor, a read only memory (ROM), a random access memory (RAM), a hard disk unit, a display unit, a keyboard, a mouse, and the like. The RAM or the hard disk unit stores a computer program. The microprocessor operates according to the computer program, thereby achieving the functions of the device or the system. Here, the computer program is configured with a combination of command codes representing instructions to the computer in order to achieve the predetermined functions.

(2) Part or all of the components constituting the above-mentioned device or system may be configured with a single system large scale integration (LSI: large-scale integrated circuit). The system LSI is an ultra-multifunctional LSI manufactured by integrating a plurality of constitutional portions on a single chip, and is specifically a computer system including a microprocessor, a ROM, a RAM, and the like. The RAM stores a computer program. The microprocessor operates according to the computer program, so that the system LSI achieves the functions.

(3) Part or all of the components constituting the above-mentioned device or system may be configured with an IC card or a single module detachably attachable to the device or system. The IC card or the module is a computer system configured with a microprocessor, a ROM, a RAM, and the like. The IC card or the module may include the above-mentioned ultra-multifunctional LSI. The microprocessor operates according to the computer program, so that the IC card or the module achieves the functions. The IC card or the module may have tamper proofness.

(4) The present disclosure may be a method described above. Alternatively, these methods may be a computer program implemented by a computer, or may be digital signals composed of a computer program.

The present disclosure may be a computer program or digital signals recorded on a computer-readable recording medium, such as a flexible disc, a hard disk, a compact disc (CD)-ROM, a DVD, a DVD-ROM, a DVD-RAM, a Blu-ray (registered trademark) disc (BD), or a semiconductor memory. Alternatively, the present disclosure may be digital signals recorded on these recording media.

Alternatively, the present disclosure may be a computer program or digital signals transmitted via an electric communication line, a wireless or wired communication line, a network such as the Internet, or data broadcasting.

Alternatively, the present disclosure may be implemented by an independent different computer by recording a system program or digital signals on a recording medium and transporting the recording medium or by transferring the program or digital signals via a network or the like.

While various embodiments have been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings, and claims is incorporated herein by reference in their entirety: Japanese Patent Application No. 2024-054149 filed on Mar. 28, 2024.

INDUSTRIAL APPLICABILITY

The in-vehicle system according to the present disclosure can reduce loads on building systems, and can be used in IVI systems provided in vehicles, for example.

The invention claimed is:

1. An in-vehicle system comprising:

a first system provided in a vehicle; and a second system to be added to the vehicle, wherein when the first system and the second system execute processing in cooperation, (i) in a first mode in which transmission and reception of a video signal and an audio signal are not performed between the first system and the second system, transmission of a signal is limited to unidirectional transmission from the first system to the second system, and (ii) in a second mode in which one or more lines of video audio signals each including at least one of a video signal or an audio signal are transmitted and received between the first system and the second system, transmission of the one or more lines of video audio signals is limited to unidirectional transmission from the first system to the second system.

2. The in-vehicle system according to claim 1, wherein the second system includes a first electronic device and a second electronic device, the first system:

transmits a switching signal corresponding to the first mode to the second system in the first mode, and transmits a switching signal corresponding to the second mode to the second system in the second mode, when the second electronic device in the second system receives the switching signal corresponding to the first mode, the second electronic device in the second system obtains a video audio signal including at least one of a video signal or an audio signal from the first electronic device, and outputs the video audio signal obtained to an output device including at least one of a display or a loudspeaker, the output device being provided in the vehicle, and when the second electronic device in the second system receives a switching signal corresponding to the second mode, the second electronic device in the second system receives the video audio signal from the first system as one of the one or more lines of video audio signals, and outputs the video audio signal received to the output device.

3. The in-vehicle system according to claim 2, wherein in the first mode, the first system accepts an operation signal in response to an input operation by a user, and transmits the operation signal to the second system, and the first electronic device in the second system receives the operation signal from the first system, generates the video audio signal by executing processing in response to the operation signal, and outputs the video audio signal generated to the second electronic device.

4. The in-vehicle system according to claim 2, wherein in the second mode, the first system accepts an audio signal of a user speech sound, and transmits the audio signal to the second system as one of the one or more lines of video audio signals, and when the first system receives a processed result signal transmitted from the second system, the first system generates a video audio signal according to the processed result signal, and transmits the video audio signal generated to the second system as one of the one or more lines of video audio signals, and the first electronic device in the second system receives the audio signal from the first system, executes audio recognition processing on the audio signal, and transmits the processed result signal obtained by the audio recognition processing to the first system.

5. The in-vehicle system according to claim 1, wherein the second system executes processing in cooperation with the first system by holding and executing a software program identical to a software program included in the first system.

6. The in-vehicle system according to claim 1, wherein the first system and the second system wirelessly transmit and receive signals other than a video signal.

7. An in-vehicle system to be added to a vehicle provided with a basic system, the in-vehicle system comprising:

a memory; and a processor that executes processing in cooperation with the basic system using the memory, wherein (i) in a first mode in which transmission and reception of a video signal and an audio signal are not performed between the basic system and the in-vehicle system, the processor does not transmit any signal to the basic system, receives a signal transmitted from the basic system to the in-vehicle system, and executes the processing, and (ii) in a second mode in which one or more lines of video audio signals each including at least one of a video signal or an audio signal are transmitted and received between the basic system and the in-vehicle system, the processor does not transmit the one or more lines of video audio signals to the basic system, receives the one or more lines of video audio signals transmitted from the basic system to the in-vehicle system, and executes the processing.

8. A signal processing method to be performed by an in-vehicle system, the in-vehicle system including a first system provided in a vehicle, and a second system to be added to the vehicle, the signal processing method comprising:

when the first system and the second system execute processing in cooperation, (i) in a first mode in which transmission and reception of a video signal and an audio signal are not performed between the first system and the second system, transmitting a signal only unidirectionally from the first system to the second system; and (ii) in a second mode in which one or more lines of video audio signals each including at least one of a video signal or an audio signal are transmitted and received between the first system and the second system, transmitting the one or more lines of video audio signals only unidirectionally from the first system to the second system.

* * * * *